United States Patent
Lauinger et al.

(10) Patent No.: US 10,320,638 B1
(45) Date of Patent: Jun. 11, 2019

(54) METHOD AND SYSTEM FOR DETERMINING WORKLOAD AVAILABILITY IN A MULTI-TENANT ENVIRONMENT

(71) Applicant: EMC Corporation, Hopkinton, MA (US)

(72) Inventors: Todd Michael Lauinger, North Oaks, MN (US); Prasanna Kunakuntla, Pleasanton, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 685 days.

(21) Appl. No.: 14/673,415

(22) Filed: Mar. 30, 2015

(51) Int. Cl.
  *G06Q 10/00* (2012.01)
  *H04L 12/26* (2006.01)
(52) U.S. Cl.
  CPC .......... *H04L 43/0805* (2013.01); *H04L 43/06* (2013.01)
(58) Field of Classification Search
  None
  See application file for complete search history.

(56) References Cited

U.S. PATENT DOCUMENTS

| | | | | |
|---|---|---|---|---|
| 7,228,546 B1* | 6/2007 | McCarthy | ............. | G06F 9/5061 718/103 |
| 9,306,814 B1* | 4/2016 | Roth | ...................... | H04L 41/085 |
| 2002/0152305 A1* | 10/2002 | Jackson | .................. | H04L 12/26 709/224 |
| 2003/0236745 A1* | 12/2003 | Hartsell | ............... | G06Q 20/102 705/40 |
| 2004/0220947 A1* | 11/2004 | Aman | ................. | G06F 11/3433 |
| 2008/0271039 A1* | 10/2008 | Rolia | ..................... | G06Q 10/06 718/105 |
| 2012/0066487 A1* | 3/2012 | Brown | .................. | G06F 9/5083 713/150 |
| 2013/0232254 A1* | 9/2013 | Srikanth | ............. | H04L 43/0876 709/224 |

* cited by examiner

*Primary Examiner* — Kenny S Lin
(74) *Attorney, Agent, or Firm* — Chamberlain, Hrdlicka, White, Williams & Aughtry

(57) ABSTRACT

In general, embodiments of the technology relate to determining availability of workloads executing on a multi-tenant system on a per-tenant basis. More specifically, embodiments of the technology determine workload availability by taking into account maintenance schedules of the workloads (or the underlying physical cloud infrastructure) and/or whether a given workload is redundant.

20 Claims, 13 Drawing Sheets

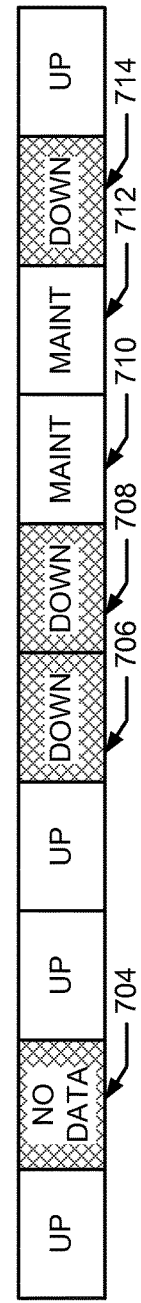

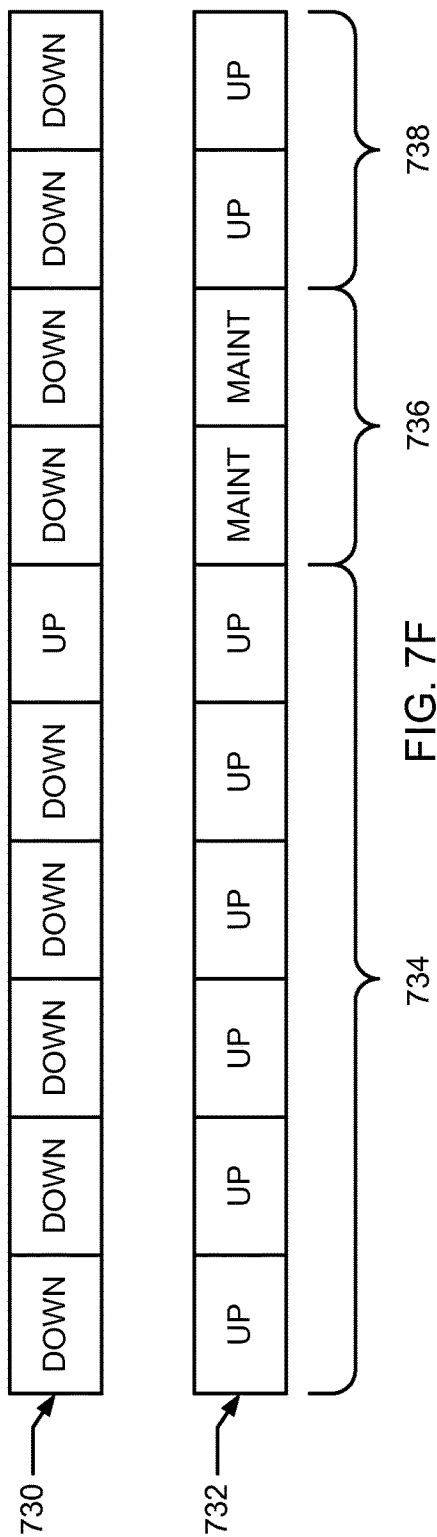

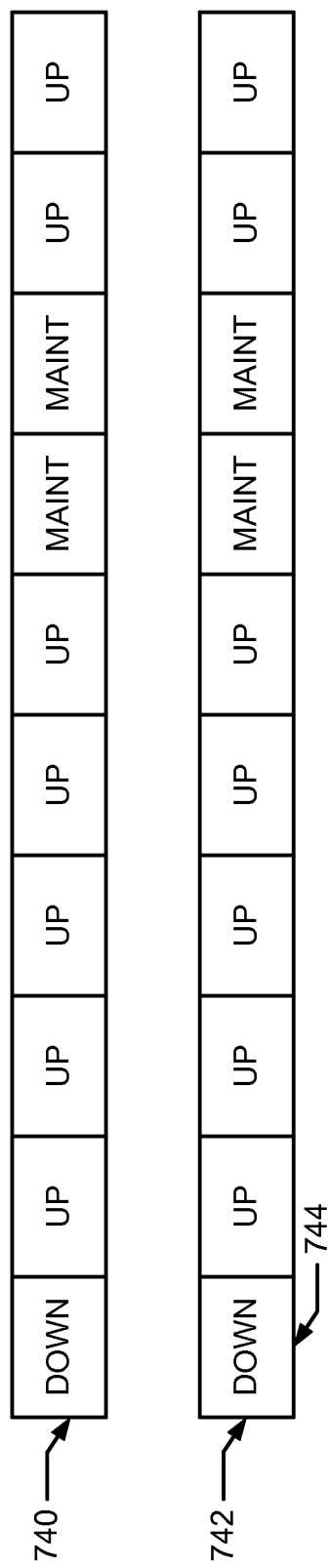

METHOD AND SYSTEM FOR DETERMINING WORKLOAD AVAILABILITY IN A MULTI-TENANT ENVIRONMENT

BACKGROUND

Multi-tenant systems typically include multiple workloads for different tenants. It is challenging to determine the availability of such workloads on a per-tenant basis using conventional approaches.

BRIEF DESCRIPTION OF DRAWINGS

FIGS. 6-7G show examples in accordance with one or more embodiments of the technology.

DETAILED DESCRIPTION

Figure 1A:
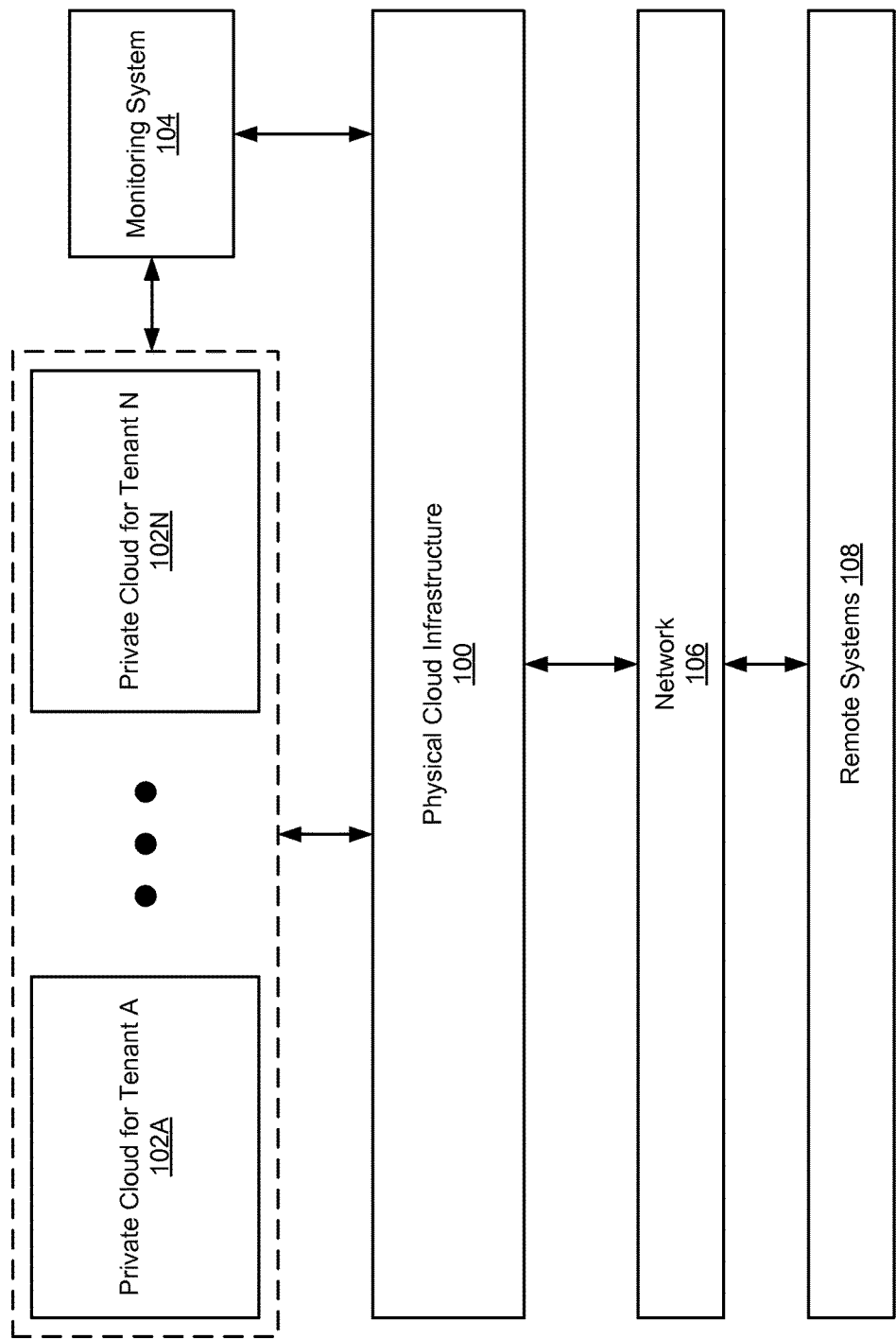
FIGS. 1A-1B show an exemplary system in accordance with one or more embodiments of the technology.

Specific embodiments of the invention will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology relate to determining availability of workloads executing on a multi-tenant system on a per-tenant basis. More specifically, embodiments of the technology determine workload availability by taking into account: (i) maintenance schedules of the workloads (or the underlying physical cloud infrastructure) and (ii) whether a given workload is redundant (i.e., are they multiple instances of the workload executing on the multi-tenant system). (See e.g., FIGS. 3, 4A-4B) Embodiments of the technology also provide the ability to determine tenant virtual system availability. (See e.g., FIGS. 5A-5B)

Figure 1B:
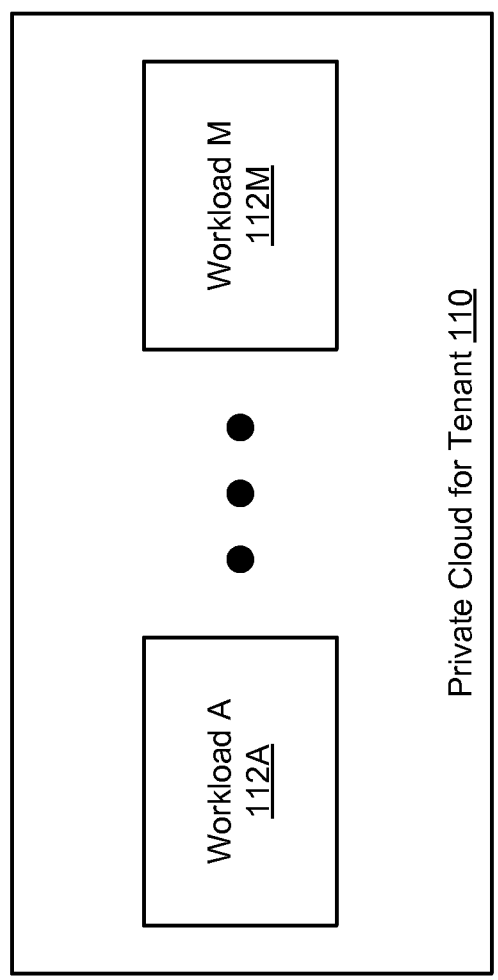

FIGS. 1A-1B show an exemplary system in accordance with one or more embodiments of the technology. The system includes a physical cloud infrastructure (100) upon which one or more private clouds are executing (102A, 102N), where each of the private clouds is associated with a particular tenant (e.g., Tenant A, Tenant N, etc.). In one embodiment of the technology, a tenant corresponds to a person or a legal entity (or a portion of a legal entity). Examples of legal entities include, but are not limited to, a corporation, partnership, professional organization, and a joint venture, etc. Examples of portions of legal entities may include, but are not limited to, a division of a legal entity, a project group within the legal entity, a product group within the legal entity, and a group of users that are employed by the legal entity.

In one embodiment of the technology, the physical cloud infrastructure is owned by an entity that is different from the users and/or legal entities that execute workloads in the private clouds. In one embodiment of the technology, the physical cloud infrastructure (100) corresponds to the physical components that enable the implementation and operation of the private clouds. Examples of the physical components include, but are not limited to, servers (see e.g., FIG. 8), routers, switches, and persistent storage (which may be external to the servers).

In one embodiment of the technology, one or more applications (not shown) may be executing on the physical cloud infrastructure that provide functionality to deploy and manage the private clouds executing on the physical cloud infrastructure. Examples of applications may include, but are not limited to, monitoring systems (104), authentication applications, resource management applications, security applications, and networking applications. In one embodiment of the technology, the monitoring system (104) may execute on the physical cloud infrastructure but in a location that is external to the private clouds. Alternatively, the monitoring system (104) may execute on a remote system that is operatively connected to the private cloud infrastructure (100). The monitoring system includes functionality to performing the methods shown in FIGS. 3-5B. Further, the monitoring system may include functionality to obtain and store (locally and/or at a remote location) records that include information about the metrics collected for the various workloads being monitored.

In one embodiment of the technology, the physical cloud infrastructure (100) is a multi-tenant system. Said another way, the physical cloud infrastructure (100) enables multiple tenants to concurrently use the physical cloud infrastructure (100). In order to support concurrent use by multiple tenants, the physical cloud infrastructure (100) includes functionality to allocate resource (e.g., processors, memory, persistent storage, bandwidth, etc.) to each of the tenants. Further, the physical cloud infrastructure (100) includes functionality to isolate the resources on a per-tenant basis such that data for a given tenant and/or resource allocated to a given tenant are not accessible to other tenants using the physical cloud infrastructure (100).

In one embodiment of the technology, the physical cloud infrastructure (100) is operatively connected to a network(s) (106), which may include any combination of wired and/or wireless components. Further, the physical cloud infrastructure (100) may interact with one or more remote systems (106) (see e.g., FIG. 8) via the network(s) (108).

Referring to FIG. 1B, in one embodiment of the technology, a private cloud for a given tenant (110) corresponds to the set of workloads executing on the physical cloud infrastructure that are associated with the tenant. Each private cloud for a tenant may include one or more workloads (112A, 112M). Further, each workload may correspond to a virtual machine executing on the physical cloud infrastructure or an application executing on the physical cloud infrastructure. In one embodiment of the technology, the application may be executing on a virtual machine, which in turn is executing on the physical cloud infrastructure.

While FIGS. 1A-1B shows a configuration of components, other configurations may be used without departing from the scope of the technology. For example, various components may be combined to create a single component. As another example, the functionality performed by a single component may be performed by two or more components.

Figure 2:
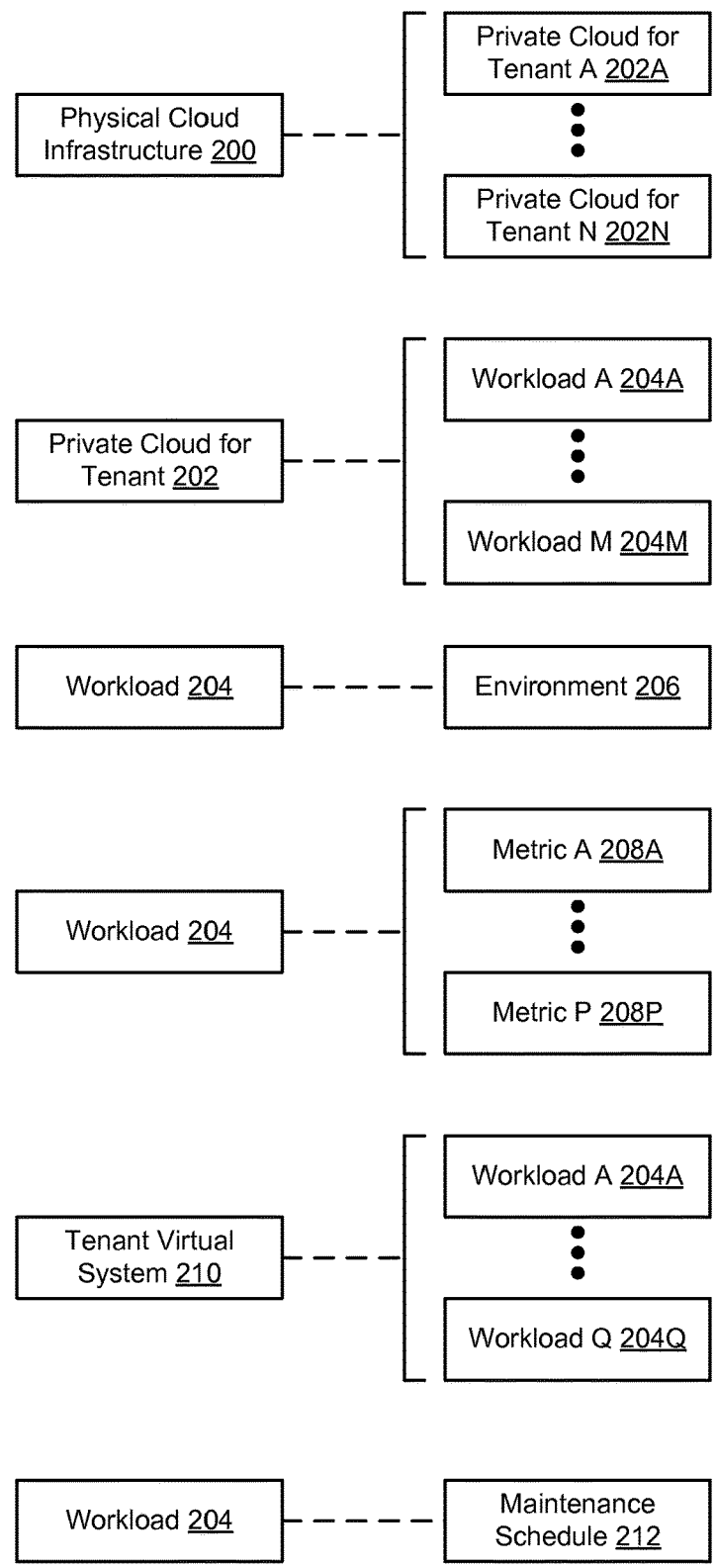
FIG. 2 shows the relationship between various components in the system in accordance with one or more embodiments of the technology.

FIG. 2 shows the relationship between various components in the system in accordance with one or more embodiments of the technology.

In one embodiment of the technology, one or more private clouds (each of which may be for a different tenant (202A, 202N) may be executing on the same physical cloud infrastructure (200). Further, each private cloud (202) may include one or more workloads (204A, 204M), where each of these workloads (204) may be associated with a particular type of environment (e.g., a production environment, a development environment, test environment, etc.). Further, metrics (208A, 208P) may be tracked for each workload (204). For example, the monitoring system may tracking whether a given workload is available. In one embodiment of the technology, if the workload is a virtual machine, then the workload is deemed to be available if the virtual machine is executing within specified operating parameters. In one embodiment of the technology, if the workload is an application, then the workload is deemed to be available if the application is executing within specified operating parameters. The normal operating parameters for a given workload may be set, e.g. by an administrator or by another entity. Other metrics related to a workload may also be tracked such as: processor usage, network bandwidth usage, memory usage, etc.

Continuing with the discussion of FIG. 2, in one or more embodiments of the technology, a workload (204A, 204Q) may be associated with one or more other workloads (204A, 204Q). A workload may be "associated" with another workload when there is data passed between the workloads (e.g., one workload generates/obtains data and the other workload consumes this data). This association of workloads may be collective referred to as tenant virtual system (210). Said another way, a tenant may create a tenant virtual system by instantiating multiple workloads within a single private cloud and then associating (as described above) each of these workloads with at least one other workload in the virtual tenant system. Finally, each workload (204) may be associated with a maintenance schedule (212). A workload may be deemed to be associated with a maintenance schedule when the workload is being updated or otherwise modified. For example, if the workload is an application, the workload may be associated with a maintenance schedule if the application is being upgraded to a new version. A workload may be deemed to be associated with a maintenance schedule when the physical cloud infrastructure upon which the workload is executing is being updated or otherwise modified. For example, if the workload is a virtual machine executing on a physical cloud infrastructure, then workload may be deemed to be associated with a maintenance schedule when the servers in the physical cloud infrastructure are being upgraded and the upgrading of the servers makes the workload unavailable (i.e., not "available", as described above).

FIGS. 3-5B show flowcharts in accordance with one or more embodiments of the technology. While the various steps in this flowchart are presented and described sequentially, one of ordinary skill will appreciate that some or all of the steps may be executed in different orders, may be combined or omitted, and some or all of the steps may be executed in parallel.

Figure 3:
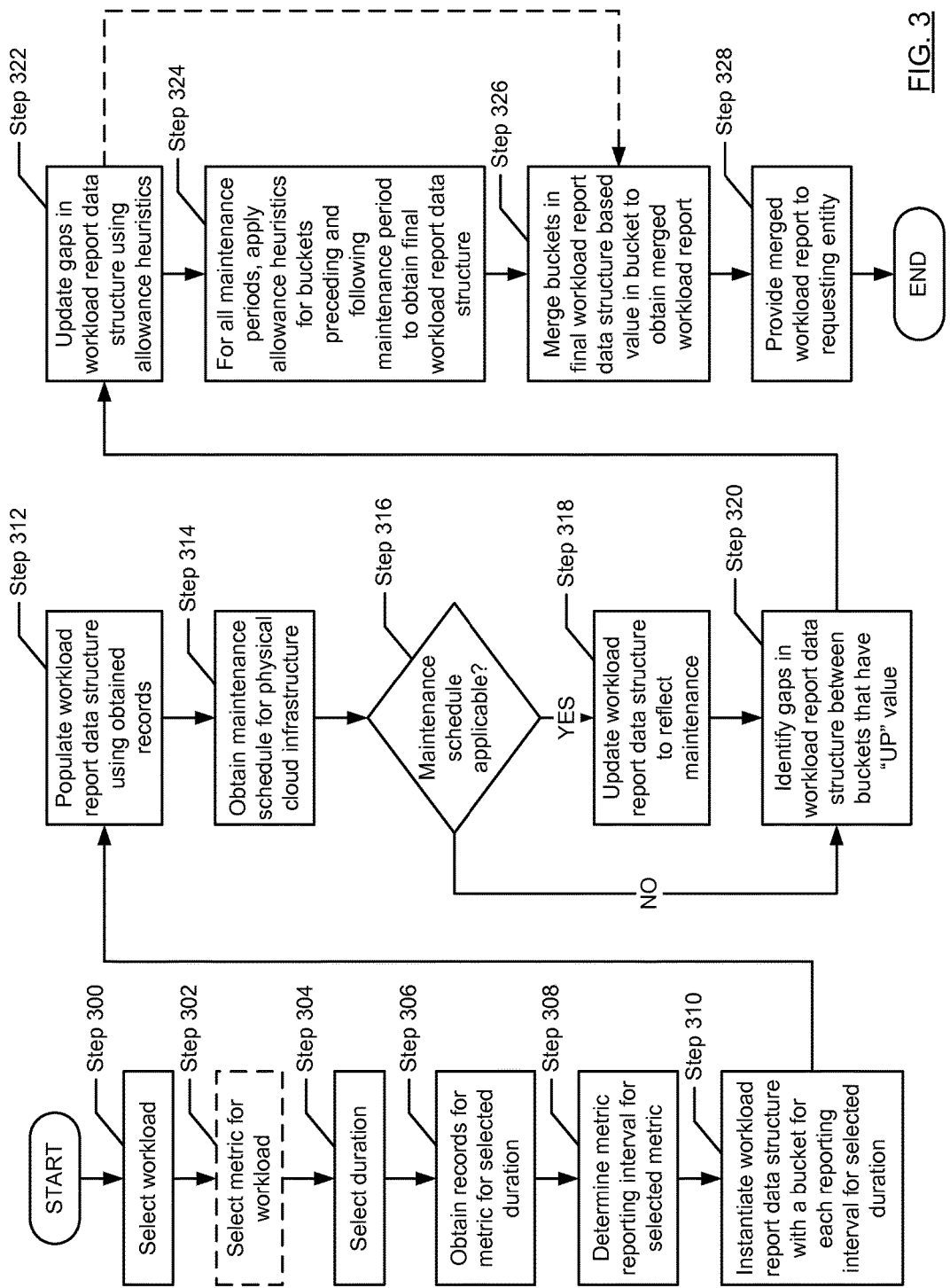
FIG. 3 shows an exemplary method for determining an availability of a workload in accordance with one or more embodiments of the technology.

FIG. 3 shows an exemplary method for determining an availability of a workload in accordance with one or more embodiments of the technology.

In step 300, a workload is selected. More specifically, the monitoring system may receive a request to determine the availability of a particular workload (i.e., a workload for a tenant in a particular environment). An example request may be—what was the availability of workload A in the production environment for tenant B in the last 24 hours.

In step 302, one or more metrics are selected for the report. If the request is only related to the availability of the workload then step 302 may not be performed. Alternatively, if additional information is request about the workload, then various other metrics may be specified, such as processor usage, memory usage, etc.

In step 304, a duration is selected. More specifically, a duration (e.g., time window) for the analysis (performed in later steps) is selected. In the scenario in which the duration is specified in the initial request (e.g., in step 300), then step 304 may not be performed.

In step 306, records for the metric(s) specified in step 300 and/or in step 302 are obtained. The records may be obtained directly for the specific private cloud upon which the workload is execution and/or the records from the monitoring system, where the monitoring system may have collected (or otherwise obtained) the records prior to step 306. In one embodiment of the technology, if the metric is availability of a workload, then the metric may be referred to an "availability record." Each availability record for a given workload may include the following information: reporting period (e.g., from time A to time B) and one of the following: (i) "UP", which indicates the workload was available for at the reporting period, (ii) "DOWN", which indicates the workload was not available for the reporting period, (iii) MAINT, which indicates the workload was undergoing maintenance (as discussed above), and (iv) "NO DATA", which indicates that no data related to availability of the workload was obtained for the reporting period.

In step 308, a determination is made about the reporting interval to use for the analysis of the records obtained in step 306. The interval selected may corresponding the interval that is the lowest common denominator for all reporting periods in the records obtained in step 306. For example, if three availability records are obtained in step 306 where the first record has a reporting period of two minutes, the second record has a reporting period of 4 minutes, and the third record has a reporting period of ten minutes, then the interval may be set to two minutes.

Continuing with the discussion of FIG. 3, in step 310, a workload report data structure is instantiated, where the workload report data structure includes a bucket for each interval for the selected duration. For example, if the selected duration was one hour and the interval is set to one minute, then the workload report data structure includes 60 buckets—one for each minute. The term "bucket" as used in about refers to location in the workload report data structure that stores an availability value (e.g., UP, DOWN, MAINT, NO DATA) for a given time interval (e.g., at 1:10 pm on Feb. 1, 2015). For example, if the workload report data structure is implemented as an array, then each element in the array may be a "bucket". In another example, if the workload report data structure is implemented as linked list, then each element in the linked list may be a "bucket." In one embodiment of the technology, instantiating the workload includes initially setting the value in each bucket to "NO DATA".

In step 312, buckets in the workload report data structure are populated using the information in the records obtained in step 306. For example, if a given record specifies that the workload was available from 11:50 am-11:51 am, then the corresponding bucket in the workload report data structure is updated to replace the "NO DATA" with value of "UP" (or another value to indicate that the workload was available).

In step 314, maintenance schedule for the workload is obtained. The maintenance schedule may be obtained directly from the workload(s), the monitoring system itself, the physical cloud infrastructure, and/or from another source external to the physical cloud infrastructure. The maintenance schedule may specify when maintenance occurred on the workload and/or physical cloud infrastructure.

In step 316, a determination is made about whether any portion of the maintenance schedule is applicable to the workload (i.e., the workload selected in step 300) for the duration specified in step 304. For example, if the maintenance schedule specifies that there was maintenance on the workload from 10:00 am on Jan. 1, 2015-12:00 pm on Jan. 1, 2015 but the duration specified in step 304 is from 10:00 am Feb. 1, 2015-1:00 pm Feb. 1, 2015, then the maintenance schedule is not applicable. If the maintenance schedule is applicable, the process proceeds to step 318; otherwise, the process proceeds to step 320.

In step 318, the workload report data structure is updated to reflect that maintenance was performed on the workload. For example, if the duration specified in step 304 is from 10:00 am Feb. 1, 2015-1:00 pm Feb. 1, 2015 with one minute intervals and the maintenance on the workload occurred from 9:45 am Feb. 1, 2015 to 10:15 am Feb. 1, 2015, then the buckets associate with times 10:00 am Feb. 1, 2015 to 10:15 am Feb. 1, 2015 are updated to reflect that maintenance was occurring on the workload.

In step 320, zero or more gaps between buckets that include "UP" are identified in the workload report data structure. For example, if there are five buckets in the workload report data structure and they have following values: UP, NO DATA, UP, UP DOWN, then the bucket with the NO DATA value may be identified as a gap between buckets with values of "UP".

In step 322, the value of the bucket that is identified as the gap in step 320 is updated in accordance with an allowance heuristics. In one embodiment of the technology, each allowance heuristic is associated with a condition that is used to identify a pattern in the workload report data structure. An example of a pattern is "UP", "NO DATA", "UP." When a pattern is located, the value for at least a part of the pattern is modified. In the above example, if the is pattern "UP", "NO DATA", "UP" then the value of bucket with "NO DATA" may be changed to "UP." The above exemplary allowance heuristic takes into account potential delays experienced by the monitoring system in receiving metrics about the various workloads. Other allowance heuristics may take into account other real-world scenarios without departing from the technology.

In step 324, an allowance heuristic is applied to buckets that precede and/or that follow a bucket that includes a value of "MAINTENANCE" (also denoted as "MAINT"). This allowance heuristics takes into account that there is a certain amount of time required to transition the workload from available to maintenance or from maintenance to available. In such scenarios, the monitoring system may change the values of buckets that precede and/or that follow a bucket that includes a value of "MAINTENANCE" from "NO DATA" or "DOWN" to "UP." In one embodiment of the technology, the allowance heuristic in step 324 may only apply to buckets that precede or follow a bucket that includes a value of "MAINTENANCE" if the bucket is within three intervals of the bucket that includes a value of "MAINTENANCE." For example, if the value of buckets is a follows: DOWN, DOWN, DOWN, NO DATA, MAINT, then application of the aforementioned allowance heuristic may result in the following values for the buckets: DOWN, UP, UP, UP, MAINT. The technology is not limited to the above example.

Continuing with the discussion of FIG. 3, the result of step 324 is a final workload report data structure. In step 326, the values in the buckets in the final workload report data structure may be merged to generate a merged workload report, where the merged workload report specifies time ranges and whether the workload was available during the time range. For example, if the following buckets represent one minute intervals starting at 9:50 am: UP, UP, UP, DOWN, UP, UP, UP, then the merged workload report may state the following: Workload UP from 9:50 am-9:52 AM, Workload down at 9:53 am and Workload up from 9:54 am-956 am.

In step 328, the merged report is provided to the requesting entity (i.e., the entity that initiated the method shown in FIG. 3).

Figure 4A:
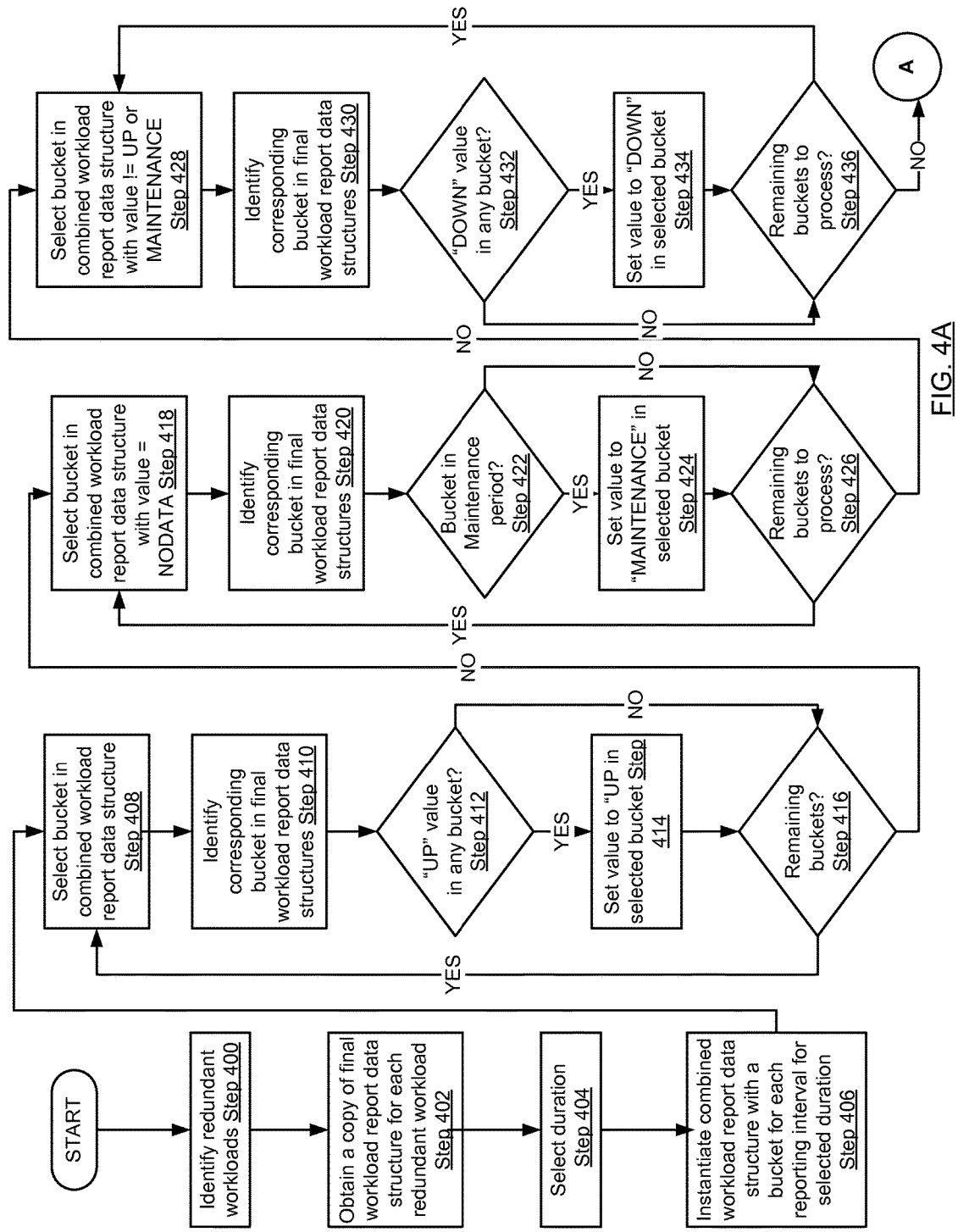
FIGS. 4A-4B show an exemplary method for determining an availability of redundant workloads in accordance with one or more embodiments of the technology.
Figure 4B:
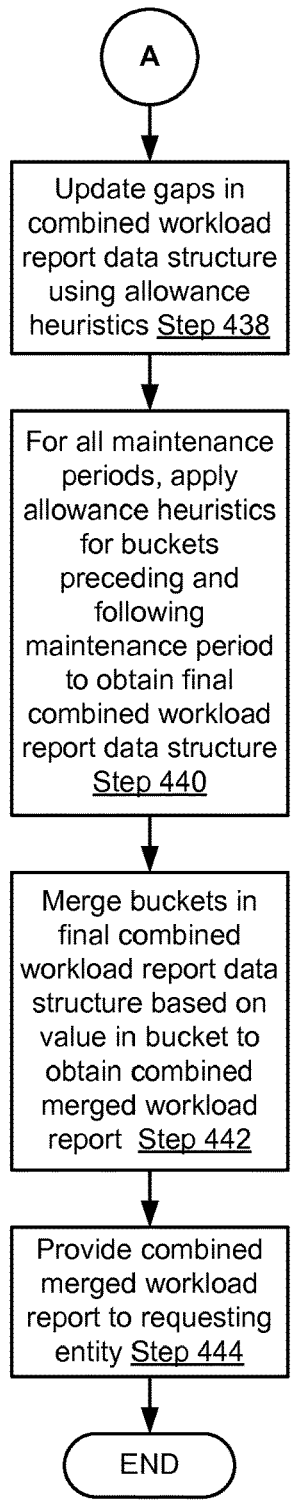

FIGS. 4A-4B show an exemplary method for determining an availability of a redundant workload in accordance with one or more embodiments of the technology. More specifically, the method shown in FIGS. 4A-4B may be performed when a request is received to determine the availability of a workload for a given duration where the workload is redundant. In one embodiment of the technology, a workload is redundant if there is another instance of the workload executing in the same private cloud for the tenant, where the requests for the workload may be processed by either instance of the workload.

Turning to FIG. 4, in step 400, the redundant workloads are identified. In one embodiment of the technology, the monitoring system may maintain information about which workloads are redundant in each private cloud that it is monitoring.

In step 402, a copy of the final workload data structure report (see Step 326) is obtained for each of the redundant workloads.

In step 404, a duration is selected. More specifically, a duration (e.g., time window) for the analysis (performed in later steps) is selected. In the scenario in which the duration is specified in a request (see step 400), then step 404 may not be performed.

In step 406, a combined workload report data structure is instantiated, where the combined workload report data structure includes a bucket for each interval for the selected duration.

In step 408, a bucket in the combined workload report data structure is selected.

In step 410, buckets in the workload report data structures (obtained in step 402) corresponding to the selected bucket in step 408 are identified. For example if the selected bucket corresponds to 9:53 am on Feb. 1, 2015, then the buckets identified in step 410 in the final workload report data structures also correspond to 9:53 am on Feb. 1, 2015.

In step 412, a determination is made about whether any of the buckets identified in step 410 include a value of "UP" (i.e., that the workload is available). If at least one of the buckets identified in step 410 includes a value of "UP, then the process proceeds to step 414; otherwise, the process proceeds to step 416.

In step 414, the value of the bucket selected in step 408 is updated to "UP".

In step 416, a determination is made about whether there are any further buckets to process prior to moving to step 418. In one embodiment of the technology, step 408-412 are performed for all buckets in the combined workload report data structure.

In steps 418-426, a second pass of the buckets in the combined workload report data structure is performed. More specifically, in step 418, a bucket is selected in the combined workload report data structure that includes the value=NO DATA.

In step 420, buckets in the final workload report data structures (obtained in step 402) corresponding to the selected bucket in step 418 are identified.

In step 422, a determination is made about whether any of the buckets identified in step 420 include a value of "MAINTENANCE" (i.e., that the workload was undergoing maintenance). If at least one of the buckets identified in step 410 includes a value of "MAINTENANCE", then the process proceeds to step 424; otherwise, the process proceeds to step 426.

In step 424, the value of the bucket selected in step 418 is updated to "MAINTENANCE".

In step 426, a determination is made about whether there are any further buckets to process prior to moving to step 428. In one embodiment of the technology, steps 418-422 are performed for all buckets in the combined workload report data structure that have a value of NO DATA (after steps 408-412 have been performed on all buckets in the combined workload report data structure).

In steps 428-436, a third pass of the buckets in the combined workload report data structure is performed. More specifically, in step 428, a bucket is selected in the combined workload report data structure that includes a value !=UP or MAINTENANCE.

In step 430, buckets in the final workload report data structures (obtained in step 402) corresponding to the selected bucket in step 428 are identified.

In step 432, a determination is made about whether the any of the buckets identified in step 430 include a value of "DOWN" (i.e., that the workload was unavailable). If at least one of the buckets identified in step 430 include a value of "DOWN", then the process proceeds to step 434; otherwise, the process proceeds to step 436.

In step 434, the value of the bucket selected in step 428 is updated to "MAINTENANCE".

In step 436, a determination is made about whether there are any further buckets to process prior to moving to step 438. In one embodiment of the technology, steps 428-432 are performed for all buckets in the combined workload report data structure that have value of NO DATA or DOWN (after steps 408-412 and step 418-422 have been performed).

In step 438, zero or more gaps between buckets that include "UP" are identified in the combined workload report data structure. The value of the bucket that is identified as the gap is updated in accordance with an allowance heuristics. (See e.g., FIG. 3, step 322).

In step 440, an allowance heuristic is applied to buckets that precede and/or that follow a bucket that includes a value of "MAINTENANCE" (also denoted as "MAINT"). This allowance heuristics takes into account that there is a certain amount of time required to transition the workload from available to maintenance or from maintenance to available. In such scenarios, the monitoring system may change the values of buckets that precede and/or that follow a bucket that includes a value of "MAINTENANCE" from "NO DATA" or "DOWN" to "UP." In one embodiment of the technology, the allowance heuristic in step 440 may only apply to buckets that precede or follow a bucket that includes a value of "MAINTENANCE" if the bucket is within three intervals of the bucket that includes a value of "MAINTENANCE." For example, if the value of buckets is a follows: DOWN, DOWN, DOWN, NO DATA, MAINT, then application of the aforementioned allowance heuristic may result in the following values for the buckets: DOWN, UP, UP, UP, MAINT.

Continuing with the discussion of FIG. 4, the result of step 440 is a final combined workload report data structure. In step 442, the values in the buckets in the final combined workload report data structure may be merged to generated a combined merged workload report, where the combined merged workload report specifies time ranges and whether any of the workloads in the set of redundant workloads was available during that time range. For example, if the following buckets represent one minute intervals starting at 9:50 am: UP, UP, UP, DOWN, UP, UP, UP, then the merged workload report may state the following: Workload UP from 9:50 am-9:52 AM, Workload down at 9:53 am and Workload up from 9:54 am-956 am.

In step 444, the combined merged workload report is provided to the request entity (i.e., the entity that initiated the method shown in FIGS. 4A-4B).

Figure 5A:
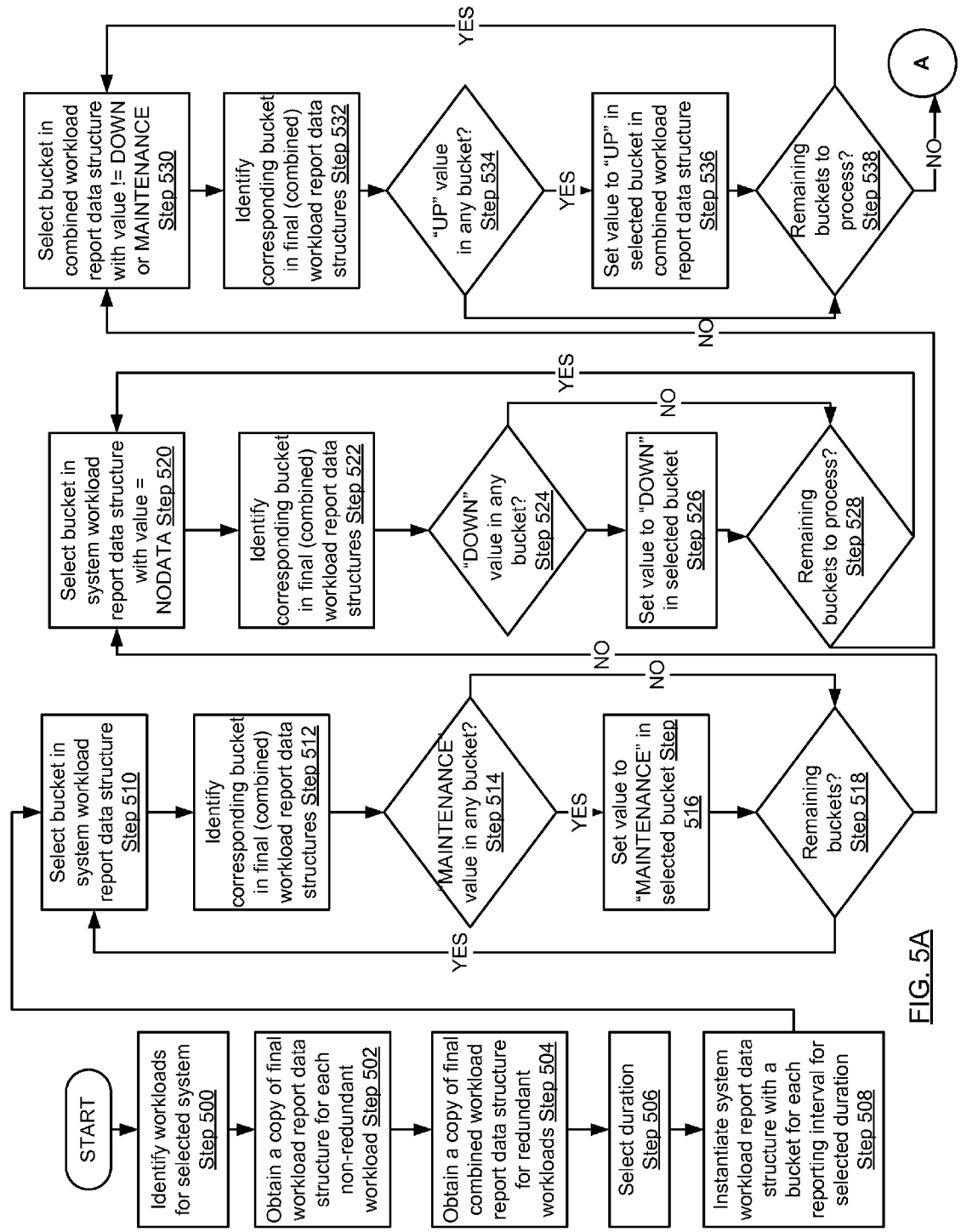
FIGS. 5A-5B show an exemplary method for determining an availability of a system that includes multiple workloads in accordance with one or more embodiments of the technology.
Figure 5B:
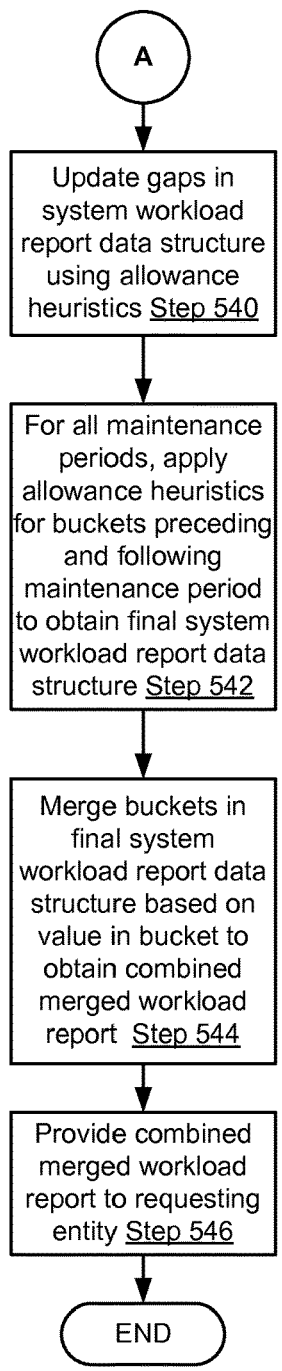

FIGS. 5A-5B show an exemplary method for determining an availability of a tenant virtual system (also referred to the system in FIGS. 5A-5B) that includes multiple workloads in accordance with one or more embodiments of the technology. More specifically, the method shown in FIGS. 5A-5B may be performed when a request is received to determine the availability of a system, which includes workloads, for a given duration.

Turning to FIG. 5, in step 500, the workloads that are included within (or otherwise make up) the system are identified. In one embodiment of the technology, the monitoring system may maintain information about which workloads are included within (or otherwise make up) the system in each private cloud that it is monitoring.

In step 502, a copy of the final workload data structure report (see Step 326) is obtained for each non-redundant workload that is part of the system.

In step 504, a copy of the final combined workload data structure report (see Step 440) is obtained for each set of redundant workloads that are part of the system.

In step 506, a duration is selected. More specifically, a duration (e.g., time window) for the analysis (performed in later steps) is selected. In the scenario in which the duration is specified in a request (see step 500), then step 506 may not be performed.

In step 508, a system workload report data structure is instantiated, where the system workload report data structure includes a bucket for each interval for the selected duration.

In step 510, a bucket in the combined workload report data structure is selected.

In step 512, buckets in the workload report data structures (obtained in steps 502 and 504) corresponding to the selected bucket in step 510 are identified.

In step 514, a determination is made about whether the any of the buckets identified in step 512 include a value of "MAINTENANCE" (i.e., that a workload in the system is undergoing maintenance). If at least one of the buckets identified in step 512 includes a value of "MAINTENANCE, then the process proceeds to step 516; otherwise, the process proceeds to step 518.

In step 516, the value of the bucket selected in step 510 is updated to "MAINTENANCE".

In step 518, a determination is made about whether there are any further buckets to process prior to moving to step 520. In one embodiment of the technology, steps 510-514 are performed for all buckets in the system workload report data structure.

In steps 520-528, a second pass of the buckets in the system workload report data structure is performed. More specifically, in step 520, a bucket is selected in the system workload report data structure that includes the value=NO DATA.

In step 522, buckets in the workload report data structures (obtained in step 502 and 504) corresponding to the selected bucket in step 520 are identified.

In step 524, a determination is made about whether the any of the buckets identified in step 522 include a value of "DOWN" (i.e., that any workload in the system was not available). If at least one of the buckets identified in step 520 includes a value of "DOWN", then the process proceeds to step 526; otherwise, the process proceeds to step 528.

In step 526, the value of the bucket selected in step 520 is updated to "DOWN".

In step 528, a determination is made about whether there are any further buckets to process in prior to moving to step 530. In one embodiment of the technology, steps 520-524 are performed for all buckets in the system workload report data structure that have a value of DOWN (after steps 510-514 have been performed on all buckets in the system report data structure).

In steps 530-538, a third pass of the buckets in the system workload report data structure is performed. More specifically, in step 530, a bucket is selected in the system workload report data structure that includes a value !=DOWN or MAINTENANCE.

In step 532, buckets in the workload report data structures (obtained in steps 502 and 504) corresponding to the selected bucket in step 530 are identified.

In step 534, a determination is made about whether the any of the buckets identified in step 532 include a value of "UP" (i.e., that all workloads in the system were available). If at least one of the buckets identified in step 532 includes a value of "UP", then the process proceeds to step 536; otherwise, the process proceeds to step 538.

In step 536, the value of the bucket selected in step 532 is updated to "UP".

In step 538, a determination is made about whether there are any further buckets to process in prior to moving to step 540. In one embodiment of the technology, steps 530-524 are performed for all buckets in the system workload report data structure that have value of NO DATA or UP (after steps 510-514 and step 520-524 have been performed).

In step 540, zero or more gaps between buckets that include "UP" are identified in the system workload report data structure. The value of the bucket that is identified as the gap is updated in accordance with an allowance heuristics. (See e.g., FIG. 3, step 322).

In step 542, an allowance heuristic is applied to buckets that precede and/or that follow a bucket that includes a value of "MAINTENANCE" (also denoted as "MAINT"). This allowance heuristics takes into account that there is a certain amount of time required to transition the system from available to maintenance or from maintenance to available. In such scenarios, the monitoring system may change the values of buckets that precede and/or that follow a bucket that includes a value of "MAINTENANCE" from "NO DATA" or "DOWN" to "UP." In one embodiment of the technology, the allowance heuristic in step 542 may only apply to buckets that precede or follow a bucket that includes a value of "MAINTENANCE" if the bucket is within three intervals of the bucket that includes a value of "MAINTENANCE." For example, if the value of buckets is a follows: DOWN, DOWN, DOWN, NO DATA, MAINT, then application of the aforementioned allowance heuristic may result in the following values for the buckets: DOWN, UP, UP, UP, MAINT.

Continuing with the discussion of FIG. 5, the result of step 542 is a final system workload report data structure. In step 544, the values in the buckets in the final system workload report data structure may be merged to generated a merged system workload report, where the system merged workload report specifies time ranges and whether the system was available during that time range. For example, if the following buckets represent one minute intervals starting at 9:50 am: UP, UP, UP, DOWN, UP, UP, UP, then the merged system workload report may state the following: system UP from 9:50 am-9:52 AM, system down at 9:53 am and system up from 9:54 am-956 am.

In step 546, the merged system report is provided to the requesting entity (i.e., the entity that initiated the method shown in FIGS. 5A-5B).

The following example is for explanatory purposes only and not intended to limit the scope of the technology.

Figure 6:
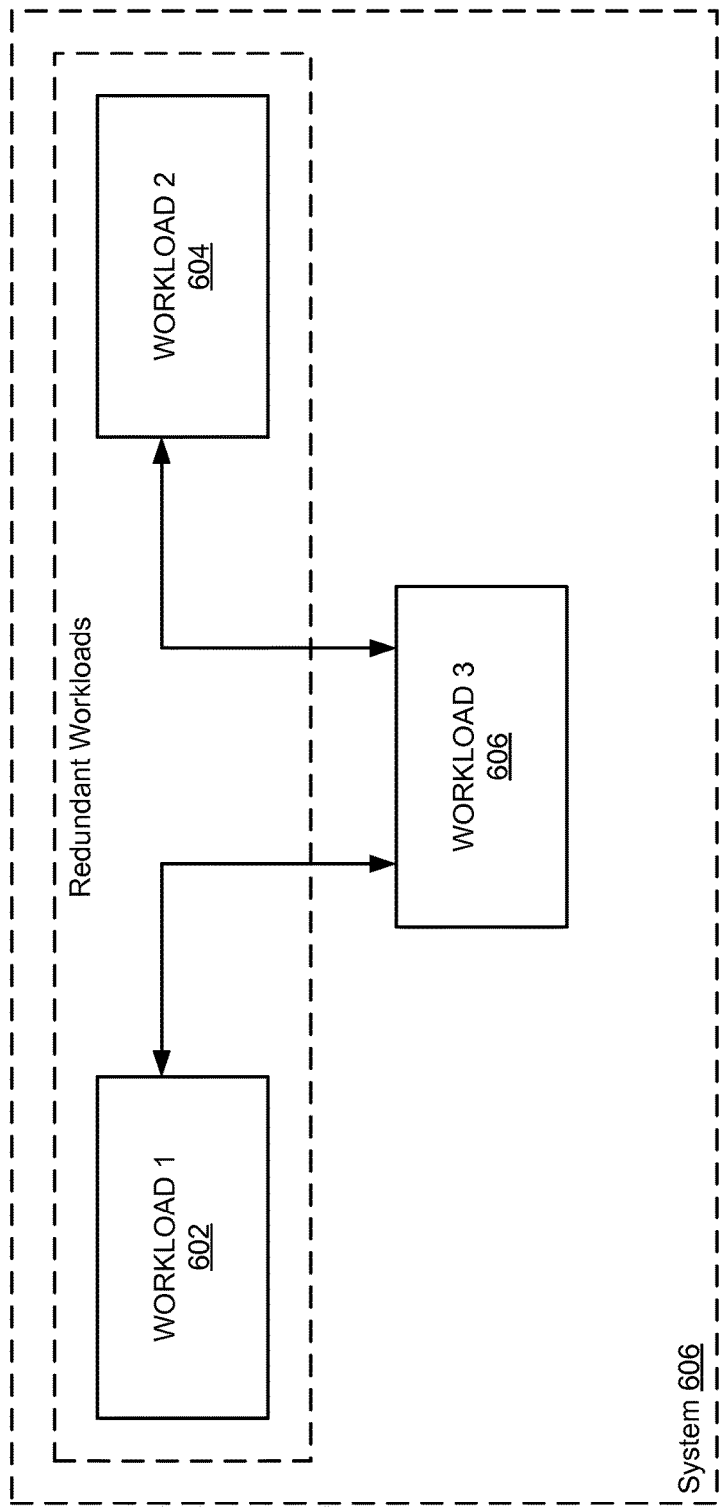

FIGS. 6-7G show examples in accordance with one or more embodiments of the technology. Turning to FIG. 6, FIG. 6 shows a tenant virtual system (also referred to as a system) (600) that includes three workloads—workload 1 (602), workload 2 (604), and workload (3), where workload 1 and workload 2 are redundant.

The following discussion with respect to FIGS. 7A-7E describes the generation of a final workload reporting data structure for workload 1 in accordance with FIG. 3 described above.

Turning to FIG. 7A, FIG. 7A shows a workload data structure when it is instantiated. See e.g., FIG. 3, Step 310. FIG. 7B shows the state of the workload reporting data structure once it is populated with records from the monitoring system. See e.g., FIG. 3, Step 312. FIG. 7C shows a maintenance schedule for workload 1. More specifically, FIG. 7C shows that during two time intervals (700, 702) workload 1 was undergoing maintenance (or the physical cloud infrastructure upon which the workload was executing was undergoing maintenance). The information in FIG. 7C is used to update the workload reporting data structure shown in FIG. 7B in order to generate the workload data structure shown in FIG. 7D. As shown in FIG. 7D, the buckets 710 and 712 have been updated to reflect that the workload was undergoing maintenance as opposed to being down.

Per the method in FIG. 3, the workload reporting data structure in FIG. 7D may be evaluated to identify patterns that match various allowance heuristics (see FIG. 3, Steps 320-324). In the example shown in FIG. 7D, bucket 704 matches the pattern for gap between two UP buckets (i.e., the pattern UP, NO DATA, UP). Further, the buckets 706, 708, and 714 match the pattern of buckets with DOWN values within three intervals of a bucket with value of MAINTENANCE. Buckets 704, 706, 708, and 714 are subsequently updated in includes values of UP in accordance with the allowance heuristics described above. The resulting final workload reporting data structure is shown in FIG. 7E.

Referring to FIG. 7F, FIG. 7F includes a final workload report data structure (730) structure for workload 2 (604). Further, FIG. 7F shows a final combined workload data structure generated in accordance with FIGS. 4A-4B using the final workload report for workload 1 (see FIG. 7E) and the final workload report for workload 2 (FIG. 7F, 730). As shown in FIG. 7F, the final combined workload report data structure (732) reflects that at least one workload in the set of redundant workloads was available for all intervals (734, 738) except two time intervals in which at least one of the workloads in the set of redundant workloads was undergoing maintenance.

Referring to FIG. 7G, FIG. 7G includes a final system report data structure (742) generated in accordance with FIGS. 5A-5B using the final workload report for workload 1 (see FIG. 7E), the final combined workload report for workload 3 (740) and the final combined workload report for the redundant workloads (FIG. 7F, 732). As shown in FIG. 7G, the final system workload report data structure (742) reflects the system (606) was available for all intervals except one interval (744) in which workload 3 was DOWN resulting in the system being down and two time intervals in which at least one of the workloads in the system was undergoing maintenance.

Figure 8:
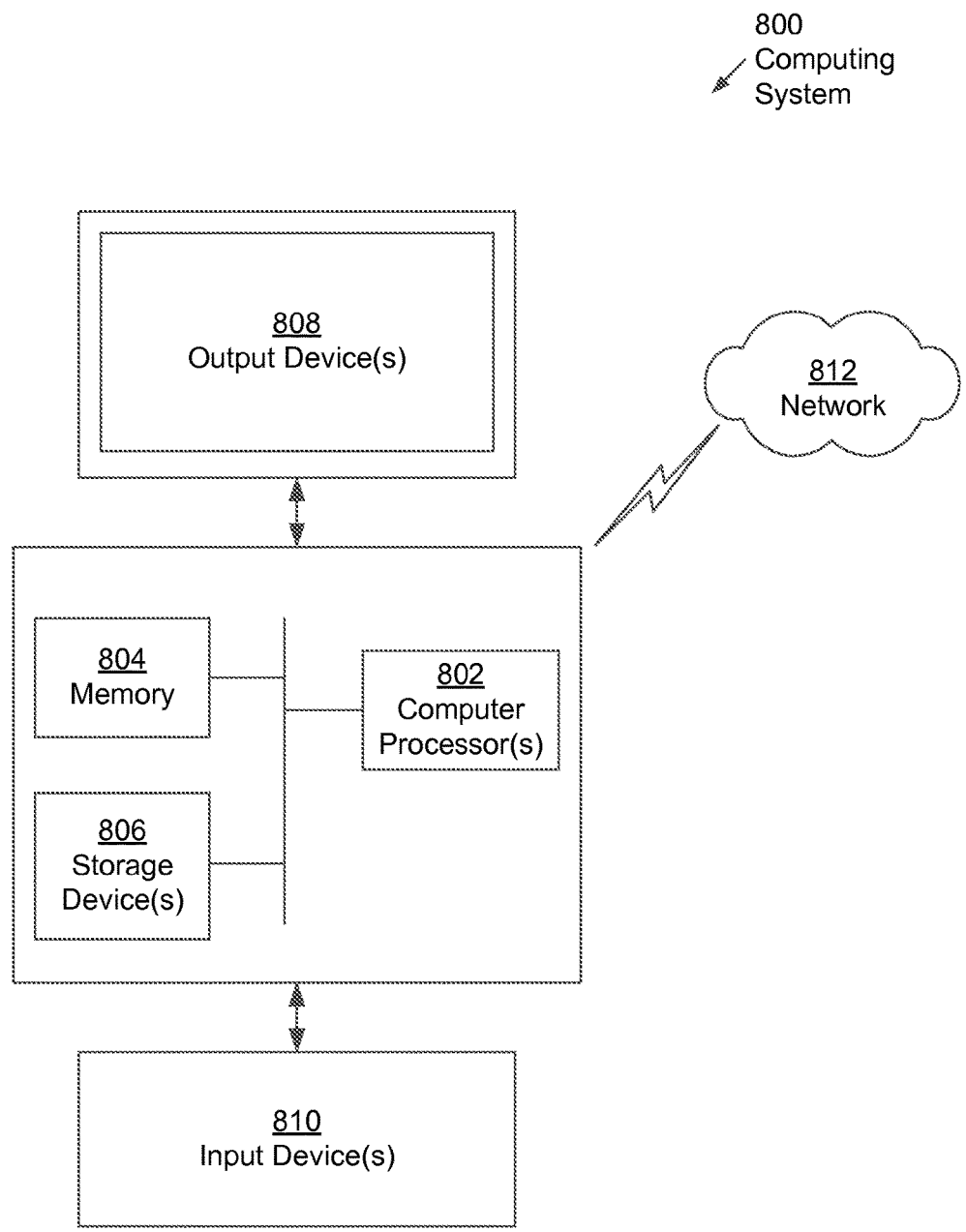
FIG. 8 shows a computing system in accordance with one or more embodiments of the technology.

Embodiments of the technology may be implemented on a computing system. Any combination of mobile, desktop, server, embedded, or other types of hardware may be used. For example, as shown in FIG. 8, the computing system (800) may include one or more computer processor(s) (802), associated memory (804) (e.g., random access memory (RAM), cache memory, flash memory, etc.), one or more storage device(s) (806) (e.g., a hard disk, an optical drive such as a compact disk (CD) drive or digital versatile disk (DVD) drive, a flash memory stick, etc.), and numerous other elements and functionalities. The computer processor(s) (802) may be an integrated circuit for processing instructions. For example, the computer processor(s) may be one or more cores, or micro-cores of a processor. The computing system (800) may also include one or more input device(s) (810), such as a touchscreen, keyboard, mouse, microphone, touchpad, electronic pen, or any other type of input device. Further, the computing system (800) may include one or more output device(s) (808), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (800) may be connected to a network (812) (e.g., a local area network (LAN), a wide area network (WAN) such as the Internet, mobile network, or any other type of network) via a network interface connection (not shown). The input and output device(s) may be locally or remotely (e.g., via the network (812)) connected to the computer processor(s) (802), memory (804), and storage device(s) (806). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

Further, one or more elements of the aforementioned computing system (500) may be located at a remote location and connected to the other elements over a network (512). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for determining availability of workloads being performed in a private cloud environment that shares physical cloud infrastructure with a second private cloud environment, comprising:
    receiving a first request for an availability of a workload for a reporting duration;
    in response to the first request:
        obtaining availability records, for the workload, that specify, in part, a portion of the physical cloud infrastructure used by the private cloud environment;
        determining a reporting interval for the reporting duration;
        instantiating a workload report data structure using the reporting duration and the reporting interval;
        populating the workload report data structure using the availability records for the workload to obtain a populated workload report data structure;
        obtaining a maintenance schedule associated with the workload;
        updating at least a portion of the workload report data structure based on the maintenance schedule associated with the workload to obtain an updated workload report data structure;
        applying, to the updated workload report data structure, at least one allowance heuristic to obtain a final workload report data structure; and
        providing a response to the first request based on the final workload report data structure.

2. The method of claim 1, further comprising:
    receiving a second request for an availability of a set of redundant workloads for the reporting duration, wherein the set of redundant workloads comprises the workload and a second workload;
    in response to the second request;
        obtaining a final workload report data structure for the second workload;

generating a final combined workload report data structure based on the final workload report data structure for the workload and the final workload report data structure for the second workload;

providing a response to the second request based on the final combined workload report data structure.

3. The method of claim 2, further comprising:

receiving a third request for an availability of tenant virtual system comprising the set of redundant workloads and a third workload;

in response to the third request;

obtaining a final workload report data structure for the third workload;

generating a final system workload report data structure based on the final workload report data structure for the third workload and the final combined workload report data structure;

providing a response to the third request based on the final system workload report data structure.

4. The method of claim 1, wherein applying the at least one allowance heuristic comprises:

identifying a pattern in at least a portion of content in the updated workload report data structure that matches a condition associated with the at least one allowance heuristic;

modifying the at least the portion of the content in the updated workload report data structure in accordance with the allowance heuristic.

5. The method of claim 4, wherein modifying the at least the portion of the content in the updated workload report data structure in accordance with the allowance heuristic comprises modifying at least one value in at least one bucket in the updated workload report data structure.

6. The method of claim 1, wherein the workload is one selected from a group consisting of a virtual machine and an application.

7. The method of claim 1, wherein the workload is executing in a multi-tenant system.

8. The method of claim 7, wherein the workload is associated with a first tenant, wherein a second workload for a second tenant is executing on the multi-tenant system.

9. The method of claim 1, wherein the maintenance schedule associated with the workload is a maintenance schedule for physical cloud infrastructure upon which the workload is executing.

10. The method of claim 1, wherein the maintenance schedule associated with the workload is a maintenance schedule for the workload.

11. A non-transitory computer readable medium comprising computer readable program code, which when executed by a computer processor enables the computer processor to:

receive a first request for an availability of a workload being performed in a private cloud environment that shares physical cloud infrastructure with a second private cloud environment for a reporting duration;

in response to the first request:

obtain availability records, for the workload, that specify, in part, a portion of the physical cloud infrastructure used by the private cloud environment;

determine a reporting interval for the reporting duration;

instantiate a workload report data structure using the reporting duration and the reporting interval;

populate the workload report data structure using the availability records for the workload to obtain a populated workload report data structure;

obtain a maintenance schedule associated with the workload;

update at least a portion of the workload report data structure based on the maintenance schedule associated with the workload to obtain an updated workload report data structure;

apply, to the updated workload report data structure, at least one allowance heuristic to obtain a final workload report data structure; and provide a response to the first request based on the final workload report data structure.

12. The non-transitory computer readable medium of claim 11, further comprising computer readable program code, which when executed by the computer processor enables the computer processor to:

receive a second request for an availability of a set of redundant workloads for the reporting duration, wherein the set of redundant workloads comprises the workload and a second workload;

in response to the second request;

obtain a final workload report data structure for the second workload;

generate a final combined workload report data structure based on the final workload report data structure for the workload and the final workload report data structure for the second workload;

provide a response to the second request based on the final combined workload report data structure.

13. The non-transitory computer readable medium of claim 12, further comprising computer readable program code, which when executed by the computer processor enables the computer processor to:

receive a third request for an availability of tenant virtual system comprising the set of redundant workloads and a third workload;

in response to the third request;

obtain a final workload report data structure for the third workload;

generate a final system workload report data structure based on the final workload report data structure for the third workload and the final combined workload report data structure;

provide a response to the third request based on the final system workload report data structure.

14. The non-transitory computer readable medium of claim 11, wherein applying the at least one allowance heuristic comprises:

identifying a pattern in at least a portion of content in the updated workload report data structure that matches a condition associated with the at least one allowance heuristic;

modifying the at least the portion of the content in the updated workload report data structure in accordance with the allowance heuristic.

15. The non-transitory computer readable medium of claim 14, wherein modifying the at least the portion of the content in the updated workload report data structure in accordance with the allowance heuristic comprises modifying at least one value in at least one bucket in the updated workload report data structure.

16. The non-transitory computer readable medium of claim 11, wherein the workload is one selected from a group consisting of a virtual machine and an application.

17. The non-transitory computer readable medium of claim 11, wherein the workload is executing in a multi-tenant system, wherein the workload is associated with a first tenant, wherein a second workload for a second tenant is executing on the multi-tenant system.

18. The non-transitory computer readable medium of claim 11, wherein the maintenance schedule associated with the workload is a maintenance schedule for physical cloud infrastructure upon which the workload is executing.

19. The non-transitory computer readable medium of claim 11, wherein the maintenance schedule associated with the workload is a maintenance schedule for the workload.

20. A system, comprising:
  a workload being performed in a private cloud environment that shares physical cloud infrastructure with a second private cloud environment;
  a monitoring system configured to:
    receive a first request for an availability of a workload for a reporting duration;
    in response to the first request:
      obtain availability records, for the workload, that specify, in part, a portion of the physical cloud infrastructure used by the private cloud environment;
      determine a reporting interval for the reporting duration;
      instantiate a workload report data structure using the reporting duration and the reporting interval;
      populate the workload report data structure using the availability records for the workload to obtain a populated workload report data structure;
      obtain a maintenance schedule associated with the workload;
      update at least a portion of the workload report data structure based on the maintenance schedule associated with the workload to obtain an updated workload report data structure;
      apply, to the updated workload report data structure, at least one allowance heuristic to obtain a final workload report data structure; and
      provide a response to the first request based on the final workload report data structure.

* * * * *